(12) United States Patent
Goto

(10) Patent No.: US 8,236,229 B2
(45) Date of Patent: Aug. 7, 2012

(54) MOLD FOR DEVELOPMENT BLADE AND METHOD OF PRODUCING DEVELOPMENT BLADE

(75) Inventor: Taihei Goto, Shiki (JP)

(73) Assignee: Bridgestone Corporation, Tokyo (JP)

( * ) Notice: Subject to any disclaimer, the term of this patent is extended or adjusted under 35 U.S.C. 154(b) by 130 days.

(21) Appl. No.: 12/743,163

(22) PCT Filed: Nov. 14, 2008

(86) PCT No.: PCT/JP2008/070796
§ 371 (c)(1),
(2), (4) Date: Jun. 7, 2010

(87) PCT Pub. No.: WO2009/063985
PCT Pub. Date: May 22, 2009

(65) Prior Publication Data
US 2010/0243144 A1   Sep. 30, 2010

(30) Foreign Application Priority Data
Nov. 14, 2007  (JP) .................................. 2007-295990

(51) Int. Cl.
*B29C 45/14* (2006.01)
(52) U.S. Cl. ................ 264/328.9; 264/259; 264/328.12; 425/129.1; 425/542
(58) Field of Classification Search ............... 264/328.9, 264/328.11, 328.12, 259; 425/542, 116, 425/127, 129.1
See application file for complete search history.

(56) References Cited

U.S. PATENT DOCUMENTS
6,226,485 B1   5/2001  Purizhansky
(Continued)

FOREIGN PATENT DOCUMENTS
EP   0 576 759 A2   1/1994
(Continued)

OTHER PUBLICATIONS

Campo, E. Alfredo, The Complete Part Design Handbook for Injection Molding of Thermoplastics, Hanser Publishers, 2006, pp. 687-705.*

(Continued)

*Primary Examiner* — Jill Heitbrink
(74) *Attorney, Agent, or Firm* — Sughrue Mion, PLLC

(57) ABSTRACT

A mold 30 for use in producing a development blade 1, which is to be formed by adhering an elastic member to an elongated-shaped hard plate 2 along the longitudinal direction LD thereof, wherein the hard plate has notched portions on both side portions in the longitudinal direction thereof and the elastic member is molded to skip the notched portions, comprises: a cavity portion CA having a shape in accordance with the shape of the elastic member; and a gate portion 35 for injecting a material into the cavity portion CA, wherein the gate portion 35 is positioned, in the longitudinal direction LD, either on a border CL between each notched portion and the center portion side of a main body of the cavity portion or on the outer side of the border or within 10 mm on the inner side of the border. Since the gate portion 35 of the cavity CA is optimally positioned in the mold, the cavity is reliably filled with a material in a case where a small-diameter portion corresponding to the notched portion exists in the cavity, whereby a development blade can be produced with suppressing short shot and generation of flash.

7 Claims, 6 Drawing Sheets

U.S. PATENT DOCUMENTS

| | | | |
|---|---|---|---|
| 6,757,960 B2 * | 7/2004 | Chiku et al. | 29/527.3 |
| 2006/0277743 A1 | 12/2006 | Goto | |

FOREIGN PATENT DOCUMENTS

| | | | |
|---|---|---|---|
| JP | 59-179325 | * | 10/1984 |
| JP | 1-132717 U | | 8/1989 |
| JP | 11-231647 A | | 8/1999 |
| JP | 2004-151249 A | | 5/2004 |
| JP | 2004-163615 A | | 6/2004 |
| JP | 2005-274644 A | | 10/2005 |
| JP | 2007-025047 A | | 2/2007 |
| JP | 2008-216275 A | | 9/2008 |
| JP | 2008-233495 A | | 10/2008 |

OTHER PUBLICATIONS

Rosato et al., Plastics Engineering, Manufacturing & Data Handbook, vol. 1, Kluwer Academic Publishers, 2001, pp. 398-403.*
Electronic translation of JP 2008-216275.*
International Search Report of PCT/JP2008/070796 dated Dec. 16, 2008.
Japanese Office Action issued in Japanese Application No. 2007-295990 dated Apr. 5, 2011.
Extended European Search Report issued in the corresponding European Application No. 08850361.0 dated Dec. 2, 2011.
Chinese Office Action issued in Application No. 200880120317.1 dated Dec. 29, 2011.

* cited by examiner (a)

(b)

(c)

(d)

| Position of gate portion | Short shot | Flash |
|---|---|---|
| -3 | ○ | △ |
| -2 | ○ | ○ |
| 0 | ○ | ○ |
| 3 | ○ | ○ |
| 5 | ○ | ○ |
| 7 | ○△ | ○ |
| 8 | △ | △ |
| 10 | △ | △ |
| 11 | × | △ |

Material viscosity: 70-600Pa·s (10s⁻¹)
Diameter of gate portion: φ0.8-1.2mm
Injection pressure: Standard 20Mpa ○ ----- Good
○△ ----- Moderately good
△ ----- Somehow acceptable
× ----- Not acceptable

MOLD FOR DEVELOPMENT BLADE AND METHOD OF PRODUCING DEVELOPMENT BLADE

CROSS REFERENCE TO RELATED APPLICATIONS

This application is a National Stage of International Application No. PCT/JP2008/070796 filed Nov. 14, 2008, claiming priority based on Japanese Patent Application No. 2007-295990 filed Nov. 14, 2007, the contents of all of which are incorporated herein by reference in their entirety.

TECHNICAL FIELD

The present invention relates to a mold for producing a development blade, which blade is formed by adhering an elastic member such as a rubber material to one side surface of a hard plate made of metal or the like. The present invention also relates to a method of producing a development blade by using such a mold as described above.

PRIOR ART

In an image forming apparatus of an electrophotographic type or an electrostatic recording type, such as a photocopier, a facsimile machine, a printer and the like (which apparatus will be generally referred to as an "OA apparatus" hereinafter), in those for color printing, in particular, there has been adopted a method of charging non-magnetic developer and transferring the developer onto a photosensitive drum by utilizing the charge of the developer. In this method, a development roller carries developer on the outer periphery thereof, the amount of the developer supplied by the rotating development roller is restricted by a development blade mounted such that the blade faces the outer periphery of the development roller, and the developer is frictionally charged by the blade.

As such a development blade as described above, there has been employed a development blade in which a rubber member, having softness sufficient to form a clearance through which developer passes and characteristics required for frictionally charging the developer, is adhered to a thin-thickness metal plate.

As a method of producing such a development blade for restricting an amount of developer as described above, there has been conventionally employed a method of: inserting at a predetermined position inside a mold a metal plate having primer pre-coated thereon, which primer is to serve as an adhesive and will be referred to as "primer" hereinafter; injecting a rubber material into a cavity of the mold by transfer molding or injection molding; and effecting molding in the mold so that a silicone rubber member or the like is adhered to the metal plate.

Further, in recent years, development blades of various types and shapes have been commercially produced to address various requests from an OA apparatus side. As a result, there has been a demand that a mold for molding a development blade should also be appropriately improved and changed accordingly. For example, JP 2004-151249 Laid-Open discloses a method of producing a development blade, in which a rubber member is adhered to a metal plate having notched portions on both sides in the longitudinal direction thereof. JP 2004-151249 proposes, in particular, a method which enables easily taking the development blade out of a mold for insert molding where the metal plate is disposed, and a mold for use in the method.

DISCLOSURE OF THE INVENTION

Problems to be Solved by the Invention

As described above, JP 2004-151249 proposes a technique for easily taking a development blade out of a mold in a production process and fails to study reliably filling the inside of a cavity with a material prior to curing. Since the metal plate employed in the development blade disclosed by JP 2004-151249 has a complicated shape, with the aforementioned notched portions on both sides in the longitudinal direction thereof, the rubber member in the vicinity of each notched portion is shaped to have a relatively small width and sectional area. As a result, it is necessary to provide a mold for use in molding the rubber member, with small-diameter portions corresponding to the vicinities of the notched portions, and also reliably fill these small-diameter portions with a rubber material or the like. However, it is generally difficult to fill a portion having such a narrow and complicated shape with a rubber material or the like and short shot in the production process may be resulted.

Accordingly, an object of the present invention is to provide a technique which enables, in a case where a cavity portion formed in accordance with the shape of an elastic member has a complicated shape which may disturb sufficient filling of a material, reliably filling the cavity portion with the material to produce a development blade.

Means for Solving the Problem

The aforementioned object can be achieved by a mold for use in producing a development blade, which blade is to be formed by adhering an elastic member to an elongated-shaped hard plate along the longitudinal direction thereof, wherein the hard plate has notched portions on both side portions in the longitudinal direction thereof and the elastic member is molded to skip the notched portions, comprising: a cavity portion having a shape in accordance with the shape of the elastic member and a widthwise dimension of 2 to 10 mm; and a gate portion for injecting a material into the cavity portion, wherein the gate portion is positioned, in the longitudinal direction, either on a border between each notched portion and the center portion side of a main body of the cavity portion or on the outer side of the border or within 10 mm on the inner side of the border.

Further, the main body of the cavity portion preferably has a rectangle-like shape and includes protruding portions formed to expand in the widthwise direction orthogonal to the longitudinal direction on the opposite side of the notched portions. Yet further, each gate portion is preferably designed to be positioned within the corresponding protruding portion in the widthwise direction. Yet further, a dimension in the widthwise dimension of each protruding portion is in the range of 1 to 10 mm.

Yet further, it is preferable that the cavity portion is formed to have a shape matching the shape of the elastic member, and gas vent portions for discharging gas are provided to the cavity portion at respective side end portions thereof located on the outer side in the longitudinal direction of the respective notched portions.

Yet further, it is preferable that a gasket for sealing is provided around the cavity portion, with a vacuum-pulling portion formed on the inner side of the gasket, such that the cavity portion is connected with an exterior gas-sucking apparatus via the vacuum-pulling portion and thus the periphery of the cavity portion can be vacuumed.

Yet further, a mold structure which is further more preferable in terms of productivity is obtained by designing the cavity portion as plural cavity portions such that plural development blades are simultaneously formed. The number of the cavity portions is preferably in the range of 4 to 16. In consideration of the gate balance, the number is preferably 4, 8 or 16.

The mold for a development blade described above is especially effective when it is applied to a method of producing a development blade by injecting a liquid silicon as a material into a mold for a development blade.

Effect of the Invention

According to the Invention, since the position of the gate portion for injecting a material into the cavity portion of the mold is optimally set in the longitudinal direction of the cavity portion, it is possible to provide a mold for a development blade, which allows, in a case where a small-diameter portion corresponding to the notched portion exists, reliably filling the cavity portion with a material to suppress short shot and generation of flash.

Further, by appropriately setting the position of the gate portion in the widthwise direction orthogonal to the longitudinal direction, as well, it is possible to provide a mold for a development blade, which enables more reliably suppressing short shot and generation of flash.

Yet further, by providing gas vent portions for discharging gas at the side end portions of the cavity portion located on the outer side of the notched portions, it is possible to provide a mold for a development blade, which allows reliably discharging gas at portions where gas tends to remain and thus more reliably suppressing occurrence of short shot.

In a case where the mold is structured such that a gasket for sealing is provided around the cavity portion to vacuum the inside of the gasket, the cavity portion can be efficiently filled with a material. In this case, discharge of gas is ensured and short shot is reliably prevented from occurring if the filling pressure (the injection pressure) of a material is relatively low.

In a case where the cavity portion is designed as plural cavity portions such that plural development blades are simultaneously formed, since plural development blades can be produced simultaneously, it is possible to shorten the molding time and simplify the vacuum facilities described above. A mold including plural cavity portions generally requires complicated control on pressure and flow of materials and thus is likely to experience variations in material-filling conditions such as gate balance between the cavity portions. As a result, a portion of a material may leak out to cause "flash" in a mold structure designed to include plural cavity portions. To address such a problem as described above, the present invention proposes a structure including the aforementioned gas vent portions and, as a more preferable option, a structure in which the periphery of the cavity portion is degassed by a gas-sucking apparatus, so that the cavity portion can be easily filled with a material at a relatively low injection pressure. Accordingly, even in a case where a cavity portion includes a portion of complicated shape which could disturb smooth filling of a material, it is possible to provide a mold which allows reliable filling of the cavity portion with the material.

It is generally known that generation of flash can be suppressed by producing a mold with an enhanced dimensional precision. However, in the case where a mold is designed to mold plural development blades simultaneously, the mold includes plural cavity portions inside thereof and it is extremely difficult to achieve good dimensional precision for all of these cavity portions. If good dimensional precision are to be achieved for all of the cavity portions, the cost required for producing the mold will increase significantly. However, if the dimensional precision of the mold is not enhanced, it is necessary to suppress generation of flash by optimizing the molding conditions (e.g. decreasing the injection pressure). As a result, adjustment required in the production process becomes complicated, thereby increasing the cost after all. In contrast, by employing the present invention, it is possible to address the aforementioned problem and optimize the molding conditions in a case where a mold fails to have good dimensional precision for all of the cavity portions thereof.

A development blade can be produced with an increased production efficiency by employing liquid silicon as a material for the mold for a development blade described above.

Hereinafter, an embodiment of the present invention will be described in detail with reference to the drawings.

Figure 1:
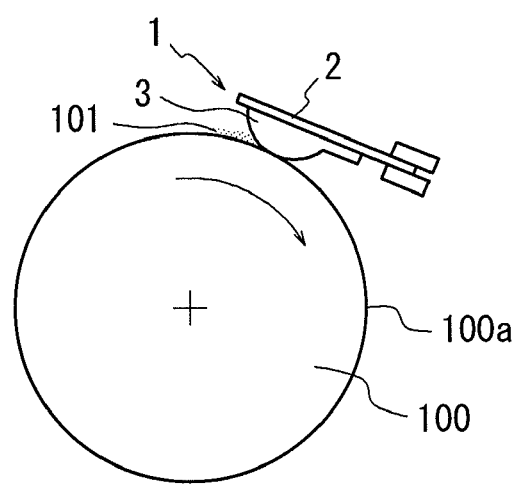
FIG. 1 is a schematic view showing a state in which a development blade, produced by using a mold of an embodiment of the present invention, is mounted to an OA apparatus.
Figure 2:
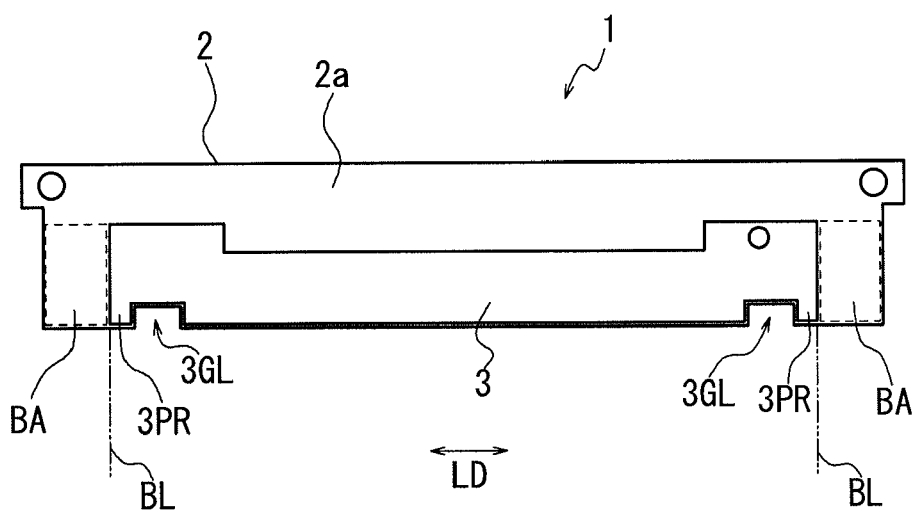
FIG. 2 is a front view showing the development blade taken out of the state shown in FIG. 1.

FIG. 1 is a schematic view showing a state in which a development blade, produced by using a mold of an embodiment of the present invention, is mounted to an OA apparatus. FIG. 2 is a front view showing the development blade taken out of the state shown in FIG. 1. A development blade 1 is structured to include a metal plate 2 as a thin elongated hard plate and a rubber member 3 as an elastic member disposed at a portion of one surface 2$a$ of the metal plate 2. Suitable employable examples of the rubber member 3 include thermo-curable resins such as two-part reaction-curable polyurethane, fluoride rubber, chloroprene rubber, silicone rubber (millable, liquid). Liquid silicone, in particular, is preferably employed as a material of the rubber member 3 in terms of performances such as physical properties and production efficiency. The metal plate 2 can be formed by stainless or the like. The rubber member 3 is adhesion fixed at the center portion in the longitudinal direction of the metal plate 2 by primer.

As shown in FIG. 1, the development blade 1 is disposed such that the blade is positioned to abut with the peripheral surface of a rotating development roller 100 or have a slight clearance between the peripheral surface of the rotating development roller and itself. The development blade 1 functions to restrict thickness of a layer of developer 101 on the peripheral surface 100a of the development roller.

Further, as shown in FIG. 2, a rubber member 3 is adhered to one surface of the development blade 1. In the metal plate 2 of the development blade 1, notched portions 3GL are formed on respective side portions in the longitudinal direction LD thereof. The rubber member 3 is molded to skip these notched portions 3GL. The structure of the development blade 1 shown as an example in the drawing will be described in detail. Blank areas BA on which nothing is to be provided are formed on respective sides of the development blade 1. The blank areas BA are regions where nothing is to be attached for use, for example, as spaces for attaching a desired seal member when/after the development blade is set on an OA apparatus. The notched portions 3GL are formed on the immediately inner side of the blank areas BA in the metal plate 2 of the development blade 1. The notched portions 3GL are formed upon a request from the OA apparatus side. As described above, the notched portions are formed on the respective side portions in the longitudinal direction LD of the metal plate 2 and the rubber member 3 is molded to skip these notched portions. Accordingly, the rubber member 3 skips the notched portions and extends to the sides beyond the notched portions (i.e. the outer sides of the notched portions), terminating at a border BL with the blank areas BA. As a result, respective extending portions 3PR of the rubber member 3 extending toward the outer sides, skipping the respective notched portions 3GL, have complicated shapes each having relatively small sectional area (relatively small width). In a specific example with reference to FIG. 2, a dimension in the longitudinal direction LD of the extending portion 3PR is approximately 1 mm.

Figure 3:
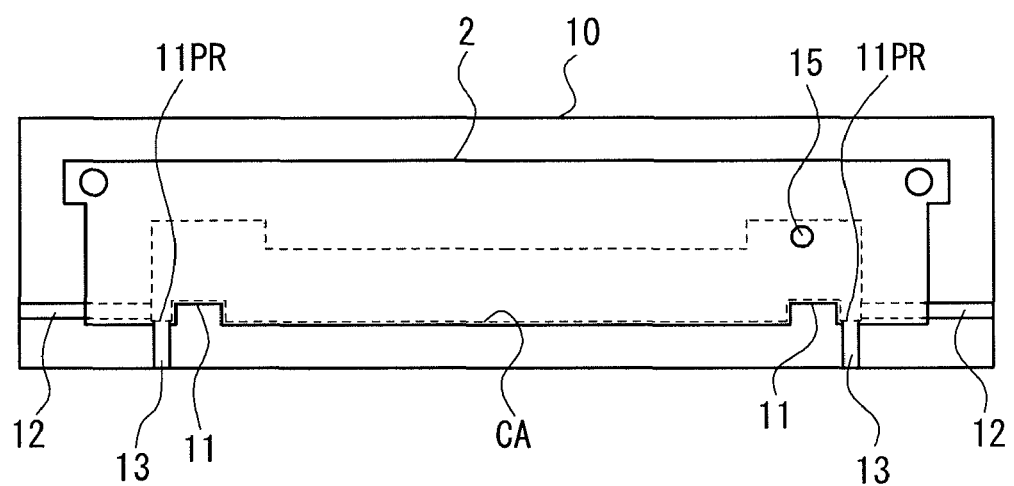
FIG. 3 is a plan view schematically showing a structure of a lower mold as one half of the mold for use in producing the development blade.

Further, with reference to the drawings, a mold suitable for producing the development blade 1 will be described. FIG. 3 is a plan view schematically showing a structure of a lower mold 10 as one half of the mold for use in producing the development blade 1. The upper mold (not shown) has a shape corresponding to the lower mold 10 and is designed such that the upper mold, when it is set on the lower mold 10, defines therebetween an inner space corresponding to the development blade 1.

In the lower mold 10 as shown in FIG. 3, a position at which the metal plate 2 is to be set is pre-set. Further, in order to form the rubber member 3 at a predetermined position of the metal plate 2, a cavity portion (a recessed portion) CA to be filled with a material prior to curing (which cavity portion will be referred to as "cavity CA" hereinafter) is formed in the lower mold 10. The cavity portion CA includes a recessed portion 11 provided at positions corresponding to the aforementioned notched portions 3GL on the respective side portions of the development blade 1, at which recessed portion the lower mold protrudes toward the inner side. The rubber member 3 can be molded to skip the notched portions 3GL by providing the recessed portions 11.

However, provision of the recessed portion 11 in the cavity CA as described above results in a situation in which regions of the cavity CA on the outer side in the longitudinal direction LD than the recessed portion 11 (i.e. regions corresponding to the regions forming the extending portions 3PR of the development blade 1, which regions of the cavity CA will be referred to as "side end portions 11PR" hereinafter) has a relatively small sectional area. As a result, gas (mainly air) may remain at the side end portions 11PR when the cavity CA is filled with a material. In this case, there may be generated in the side end portions 11PR a portion where the material has not been filled, causing short shot.

In view of this, the inventors of the present invention studied and specified the optimum conditions which allow reliable filling when the gate portion for injecting a material into the cavity CA (shown by reference number 15 in FIG. 3) is shifted toward the side end portion to facilitate introduction of a material prior to curing to the side end portions of the cavity.

Figure 4:
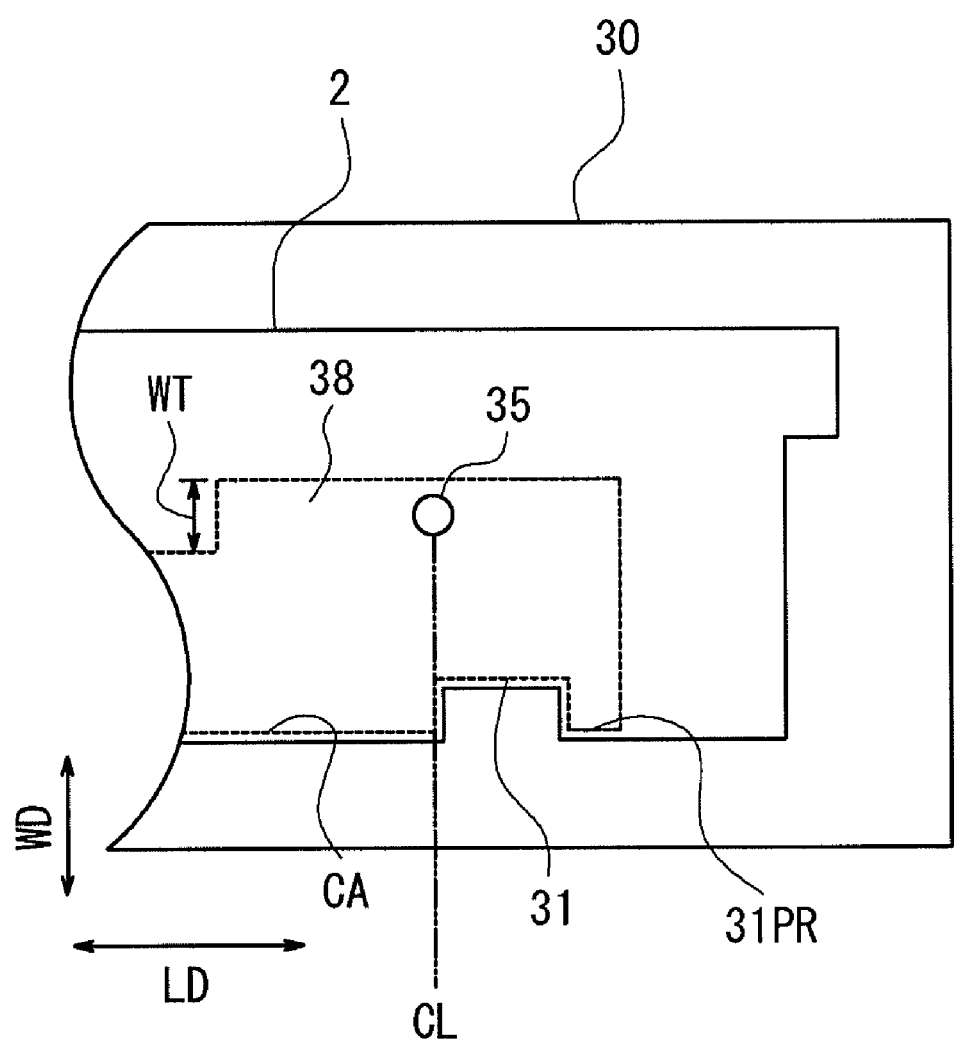
FIG. 4 is a view for explaining setting of the position of a gate portion.

The inventors of the present invention have confirmed that short shot and generation of flash of a material can be suppressed by setting the position of the gate portion for injecting a material in the optimum manner. Preferably position setting of the gate portion will be described with reference to the drawings. FIG. 4 is a diagram for explaining position setting of the gate portion, showing a portion of the mold (the right hand-side portion) in an enlarged manner. The gate portion 35 of the mold 30 shown in FIG. 4 is located at a predetermined position in relation and corresponding to the regions of the cavity for forming the extending portion 3PR of the development blade 1 (see FIG. 2), i.e. the recessed portion 31 and the side end portion 31PR present on the outer side thereof. FIG. 4 shows the lower mold in a state in which the metal plate 2 is set thereon, as in FIG. 3, and the cavity CA located under the metal plate 2 is shown by dotted lines. The cavity CA has a rectangle-like shape. The cavity CA includes projected portions (tub portions) 38 provided on the opposite side of the recessed portions 31 (the portions for forming the notched portions) in the widthwise direction WD orthogonal to the longitudinal direction LD so as to expand from the main body by the width WT.

The shape of the development blade 1 is prescribed in accordance with requests from the OA apparatus side to be employed, and the shape (dimension) of the cavity CA inside the mold is determined in accordance therewith. Dimensions of the cavity CA are approximately in the range of 150 to 300 mm in the longitudinal direction LD and in the range of 2 to 10 mm in the widthwise direction WD. Further, a dimension of the projected portion 38 in the longitudinal direction LD is, for example, in the range of 5 to 30 mm and the magnitude of projection thereof in the widthwise direction WD is in the range of 1 to 10 mm or so.

In the mold 30 as shown in FIG. 4, the gate portion 35 is preferably positioned, in the longitudinal direction LD, either on a border CL between each notched portion 31 and the center portion side of the main body of the cavity portion or on the outer side of the border. Alternatively, the gate portion 35 is preferably positioned within 10 mm on the inner side of the border CL. In a case where the cavity CA has the aforementioned shape (dimensions), a dimension of the side end portion 31PR in the longitudinal direction LD is, e.g. 1 mm, a dimension of the recessed portion 31 is, e.g. 3 mm, and a dimension of the projected portion 38 in the longitudinal direction is, although there is no specific restriction thereon, e.g. 15 mm or so.

Further, the gate portion 35 is positioned within the projected portion 38 protruding from the main body in the widthwise direction WD. A dimension of the main body in the widthwise direction WD is, e.g. 9.5 mm. The width WT by which the projected portion 38 protrudes from the main body, with no specific restriction thereon, may be a widthwise dimension which allows the gate portion 35 to be set with sufficient space therearound. The gate portion 35 is, for example, a circular duct. The diameter of the gate portion 35 is preferably in the range of 0.3 to 2.0 mm and more preferably in the range of 0.5 to 1.2 mm.

The position at which the gate portion 35 is disposed is preferably within the protruding portion 38, as described above. An effect of suppressing short shot and generation of flash is likely to be obtained by disposing the gate portion 35 so as to at least satisfy the aforementioned conditions in the longitudinal direction LD. If the gate portion 38 were to be disposed on the main body side than the protruding portion, in particular, lower in FIG. 2 than the center in the widthwise direction of the main body, what is called "sink marks" would tend to be generated in the main body. Therefore, the gate portion 35 is preferably disposed within the protruding portion 38.

FIGS. 5(a) to 5(d) are schematic views each showing relationship between the setting position of a gate portion 35 and the problems like short shot and occurrence of flash. In each of FIGS. 5(a) to 5(d), the border CL is set as the zero point (0) and the region from the border CL toward the center side of the main body (the left hand-side in the drawings) is regarded as the "plus (+)" region and the region from the border CL toward the outer side via the recessed portion 31 is regarded as the "minus (−) region. In each of FIGS. 5(a) to 5(d), plural arrows starting from the gate portion 35 represent flows of a material, respectively.

Figure 5:
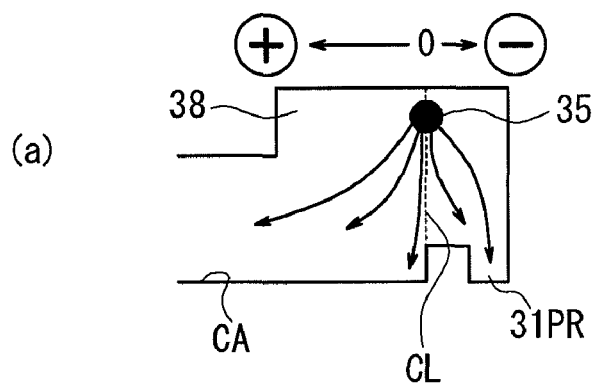
FIGS. 5($a$) to 5($d$) are schematic views each showing relationship between the setting position of a gate portion and the problems like short shot and occurrence of flash.
Figure 5:
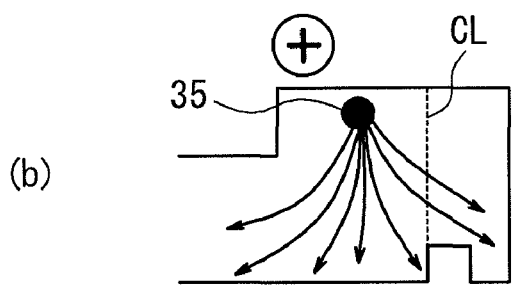
Figure 5:
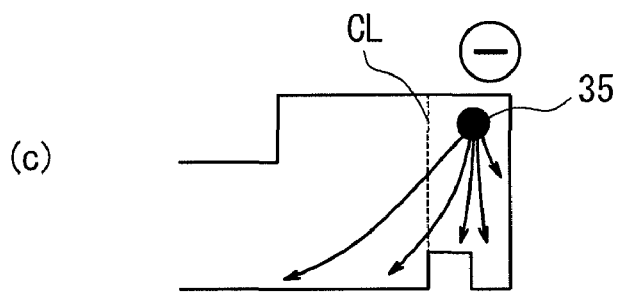
Figure 5:
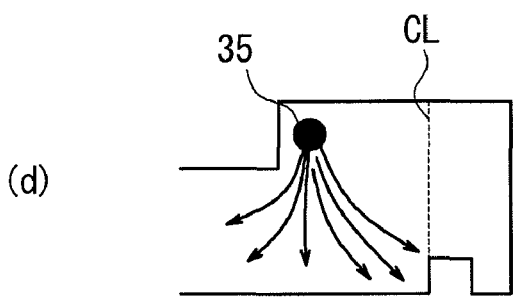

FIG. 5(a) shows a case where the gate portion 35 is disposed on the border CL so that the material can be flowed toward the main body side and the side end portion 31PR side with the optimum balance therebetween. It is thus the most preferable to dispose the gate portion 35 on the border CL, as shown in FIG. 5(a). FIG. 5(b) represents a case where the gate portion 35 is disposed within 10 mm on the inner side of the border CL and FIG. 5(c) represents a case where the gate portion 35 is disposed on the outer side of the border CL. In either of these two cases, the gate portion 35 can be appropriately disposed within the specified ranges because a material can be flowed on the center side and the side end portion 31PR side of the main body in an acceptable manner. However, in the case of FIG. 5(c), if the gate portion 35 is disposed toward the outer side too much, flash may be generated.

FIG. 5(d) represents a case as a comparative example where the gate portion 35 is disposed more than 10 mm on the inner side of the border CL. If the gate portion 35 is disposed on the inner side too much as this case, a material cannot be flowed toward the side end portion 31PR in a sufficient manner, whereby short shot is likely to occur.

Figure 6:
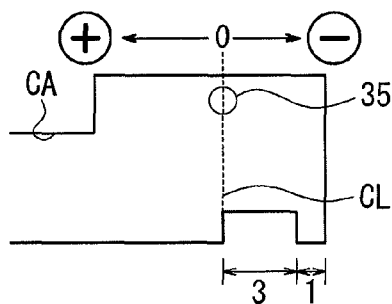
FIG. 6 is a view showing a specific example of a mold, and the upper part of the drawing is a schematic view of the mold and the lower part of the drawing is a table summarizing relationship between the position of a gate portion and presence/absence of short shot and flash.

FIG. 6 is a view showing a specific example of the aforementioned mold 30, and the upper part of the drawing is a schematic view of the mold and the lower part of the drawing is a table summarizing relationship between the position of the gate portion and presence/absence of short shot and flash. The viscosity of a material in the present embodiment is in the range of 70 to 600 Pa·s ($10 \text{ s}^{-1}$) and the diameter of the gate portion 35 is in the range of 0.8 to 1.2 mm. The standard injection pressure is 20 MPa, but may be appropriately increased up to 50 MPa in a case where short shot occurs.

As is obvious from FIG. 6, the position at which the gate portion 35 is disposed in the longitudinal direction is preferably within 10 mm and more preferably within 7 mm on the inner side of the border CL. Alternatively, the position at which the gate portion 35 is disposed in the longitudinal direction is preferably within 3 mm and more preferably within 2 mm on the outer side of the border CL. It should be noted that the aforementioned ranges apply to a case where a recessed portion of 3 mm width is provided on the outer side of the border CL and a side end portion of 1 mm width is provided on the outer side of the recessed portion. In the table shown in the lower part of FIG. 6, a preferable setting range of the gate portion is indicated as AR and a more preferable setting range thereof is indicated as GR.

Further, a structure which the aforementioned mold preferably possesses will be described hereinafter. FIG. 3 will be referred to again. The cavity CA of the lower mold 10 shown in FIG. 3 is further provided with passage-shaped gas vent portions 12, 13 for discharging gas remaining in the side end portions 11PR. In the present embodiment, a first gas vent portion 12 provided to extend in the longitudinal direction and a second gas vent portion 13 provided to extend to be orthogonal to the first gas vent portion are exemplarily shown. It is acceptable to modify the structure, according to requests when the cavity CA is designed, so that only one of the aforementioned gas vent portions is provided. In FIG. 3, the lower mold 10 is shown in a state where the metal plate 2 is set thereon and, accordingly, the cavity CA and portions of the gas vent portions 12 located under the metal plate 2 are shown by dotted lines. In FIG. 3, the positions of the gate portions are shown by reference numeral 15.

In the case where the gas vent portions 12, 13 are provided as described above, when the cavity CA is filled with a material having relatively low viscosity and a pressure which is equal to or exceeds a predetermined pressure is applied to the cavity to prevent gas from remaining inside the side end portions 11PR, an employed material may leak out from clearance portions to generate flash, depending on the viscosity of the material. Therefore, it is preferable to appropriately adjust the viscosity of the material for use, the injection pressure, and the inner diameters, thicknesses, widths and the like of the gas vent portions 12, 13. In a specific example of the gas vent portion 12 with reference to FIG. 3, the width (the dimension in the upper-lower direction in FIG. 3) thereof may be approximately 3.0 mm and the thickness (the dimension in the direction normal to the FIG. 3 sheet) thereof may be approximately 0.001 to 0.01 mm when the viscosity of the material is in the range of 70 to 600 Pa·s ($10 \text{ s}^{-1}$) and the injection pressure is in the range of 10 to 50 MPa.

Figure 7:
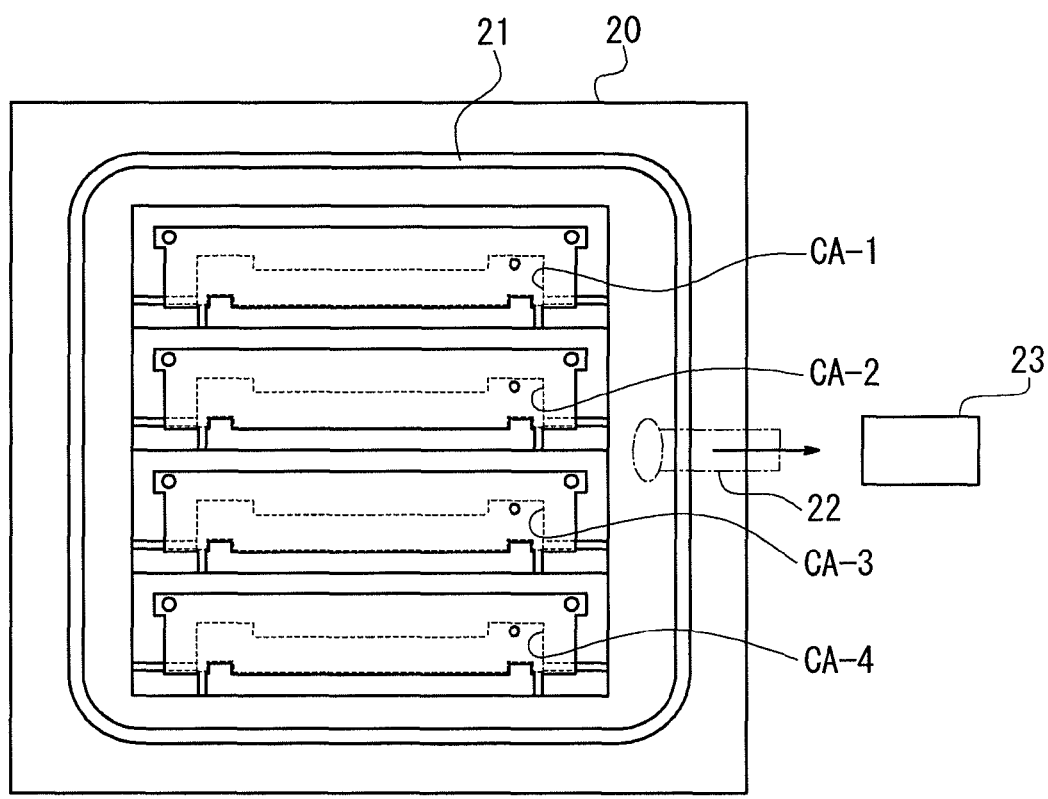
FIG. 7 is a view showing an example of a mold designed to mold plural development blades simultaneously.

Further, while the lower mold 10 exemplarily shown in FIG. 3 represents a case where the development blade is produced individually (one by one), the lower mold 20 exemplarily shown in FIG. 7 is designed such that plural development blades 1 are simultaneously molded (FIG. 7 shows an example in which four development blades are simultaneously molded). Specifically, in the example of FIG. 7, four cavities CA-1 to CA-4 are formed within the lower mold 20 to produce four development blades simultaneously. The metal plate 2 is held at a predetermined position in the lower mold 20 such that the respective cavities CA-1 to CA-4 are disposed on the inner side thereof. Specifically, the metal plate 2 having primer coated in advance thereon is set on the lower mold and then the upper portion of the lower mold is closed by the upper mold (not shown). Thereafter, a predetermined regions of the respective cavities CA-1 to CA-4 are filled with a material and the material is cured. In this case, since plural development blades 1 can be produced simultaneously, time required for molding can be shortened and thus cost can be reduced.

Further, another structure which the aforementioned mold preferably possesses will be described with reference to FIG. 7. A gasket 21 for sealing is provided around the cavities CA-1 to CA-4 of the lower mold 20 and a vacuum-pulling portion 22 is provided to (tunnel the mold under the gasket and) open at the inner side of the gasket 21. The vacuum-pulling portion 22 is adapted to be connectable with an external gas-sucking apparatus (a vacuum pump) 23 to pull vacuum around the cavities inside the gasket 21. The peripheries of the cavities can be set at a relatively low pressure so that unnecessary gas can be swiftly discharged from the inside of the cavities, by further including a structure for pulling vacuum as described above. As a result, it is possible to make a material smoothly flow into the respective cavities to prevent short shot from occurring. Needless to say, the vacuum pulling structure described above may be provided in the mold for molding a single development blade at a time, as shown in FIG. 3. In the case of the mold for molding plural development blades simultaneously as shown in FIG. 7, the structure relating to the vacuum-pulling can be shared by the cavities and thus the vacuum facilities can be simplified, whereby productivity is increased and cost per a product can be lowered. It should be noted that the aforementioned preferable setting conditions of the position at which the gate portion is disposed can be applied to, not only the mold for molding a single development blade at a time, but also the mold for molding plural development blades simultaneously.

Although a preferable embodiment of the present invention has been described in detail in the foregoing descriptions, the present invention is not restricted to such a specific embodiment as described above and various changes and modifications can be made thereto within the scope of the gist of the present invention defined in the claims below.

INDUSTRIAL APPLICABILITY

As is obvious from the foregoing descriptions, according to the present invention, a mold for reliably and efficiently producing a development blade for use in an OA apparatus can be provided.

The invention claimed is:

1. A mold for use in producing a development blade, which blade is to be formed by adhering an elastic member to an elongated-shaped hard plate along the longitudinal direction thereof, the mold comprising:
 a cavity portion having a shape in accordance with the shape of the elastic member and including respective notched portions at respective ends in the longitudinal direction, such that the cavity portion is divided into a center portion between the two notched portions, and respective side end portions on the outer sides in the longitudinal direction of the notched portion, the cavity portion having a widthwise dimension of 2 to 10 mm; and
 a gate portion for injecting a material into the cavity portion,
 wherein the gate portion is positioned, in the longitudinal direction, either on a border between each notched portion and the center portion of the cavity portion, on one of the outer sides or on the center portion within 10 mm of the border.

2. The mold for a development blade of claim 1, wherein the cavity portion includes a tub portion on each end of the cavity portion, the tub portions each protruding in the widthwise direction on the opposite side of the notched portions and overlapping, in the longitudinal direction, with a portion of the center portion and the corresponding outer side portion, and
 the gate portion is positioned within one of the protruding portions in the widthwise direction.

3. The mold for a development blade of claim 2, wherein a dimension in the widthwise dimension of each tub portion is in the range of 1 to 10 mm.

4. The mold for a development blade of claim 1, wherein the cavity portion is formed to have a shape matching the shape of the elastic member, and gas vent portions for discharging gas are provided to the cavity portion at the respective side end portions thereof located on the outer side in the longitudinal direction of the respective notched portions.

5. The mold for a development blade of claim 1, wherein a gasket for sealing is provided around the cavity portion, with a vacuum-pulling portion formed on the inner side of the gasket, such that the cavity portion is connectable with an exterior gas-sucking apparatus via the vacuum-pulling portion and thus the periphery of the cavity portion can be vacuumed.

6. The mold for a development blade of claim 5, wherein the mold is structured to include plural cavity portions such that plural development blades are simultaneously molded.

7. A method of producing a development blade using the mold of claim 1, the method comprising:
 injecting a material into the cavity portion via the gate portion,
 wherein the material is a liquid silicon.

* * * * *